United States Patent [19]
Hazan

[11] Patent Number: 6,119,682
[45] Date of Patent: Sep. 19, 2000

[54] WATER HEATER AND STORAGE TANK

[76] Inventor: Haim Hazan, 312/12 Zvi Borenstein Street, Yerucham, Israel, 80500

[21] Appl. No.: 09/230,537

[22] PCT Filed: Jul. 30, 1997

[86] PCT No.: PCT/GB97/02066

§ 371 Date: Jan. 27, 1999

§ 102(e) Date: Jan. 27, 1999

[87] PCT Pub. No.: WO98/04874

PCT Pub. Date: Feb. 5, 1998

[30]  Foreign Application Priority Data

Jul. 30, 1996 [IL]  Israel ........................................ 118982

[51] Int. Cl.$^7$ ......................................................... F24J 2/44
[52] U.S. Cl. ......................... 126/638; 126/639; 126/611; 126/612
[58] Field of Search ..................................... 126/638, 639, 126/612, 613, 642, 641, 640, 610, 611; 165/104.22, 104.24

[56]  References Cited

U.S. PATENT DOCUMENTS

| | | | |
|---|---|---|---|
| 1,242,511 | 10/1917 | Bailey . | |
| 4,003,367 | 1/1977 | Wikholm . | |
| 4,261,333 | 4/1981 | Guarnaschelli | 126/612 |
| 4,282,421 | 8/1981 | Hadar | 219/314 |
| 4,421,100 | 12/1983 | Yu | 126/435 |
| 4,567,878 | 2/1986 | Larkin | 126/639 |
| 4,637,375 | 1/1987 | Larkin | 126/434 |
| 5,462,047 | 10/1995 | Kleinwachter | 126/639 |

FOREIGN PATENT DOCUMENTS

| | | |
|---|---|---|
| 488085 | 5/1976 | Australia . |
| 2590000 | 5/1987 | France . |
| 48555 | 11/1975 | Israel . |
| 53396 | 11/1977 | Israel . |
| 8303984 | 6/1985 | Netherlands . |
| 1564887 | 4/1980 | United Kingdom . |

*Primary Examiner*—James C. Yeung
*Attorney, Agent, or Firm*—Ostrolenk, Faber, Gerb & Soffen, LLP

[57] ABSTRACT

The invention provides a low-profile, solar energy powered, thermosyphon-circulated water heater and storage device (10) comprising: a flat, tilted solar radiation absorber panel (12); an insulated hot fluid storage tank (18); a conduit (20) providing fluid communication between a lower area of said absorber panel (12) and said storage tank (18), and a further conduit (22) providing fluid communication between an upper area of said absorber panel (12) and an upper area of said storage tank (18) to complete a thermosyphonic path between said panel sand said tank. An extended-length heat-exchanger piping circuit (24) having an entry port (26) for cold, line-pressure water, an outlet port (28) for hot water and arranged within said tank (18) to facilitate the transfer of heat between fluid held in said storage tank (18) and line-pressure water passing through said piping (24); and, an electric water immersion heater (30) positioned in a housing (32) located in an upper area of said storage tank (18) adjacent said extended length piping circuit (24).

10 Claims, 2 Drawing Sheets

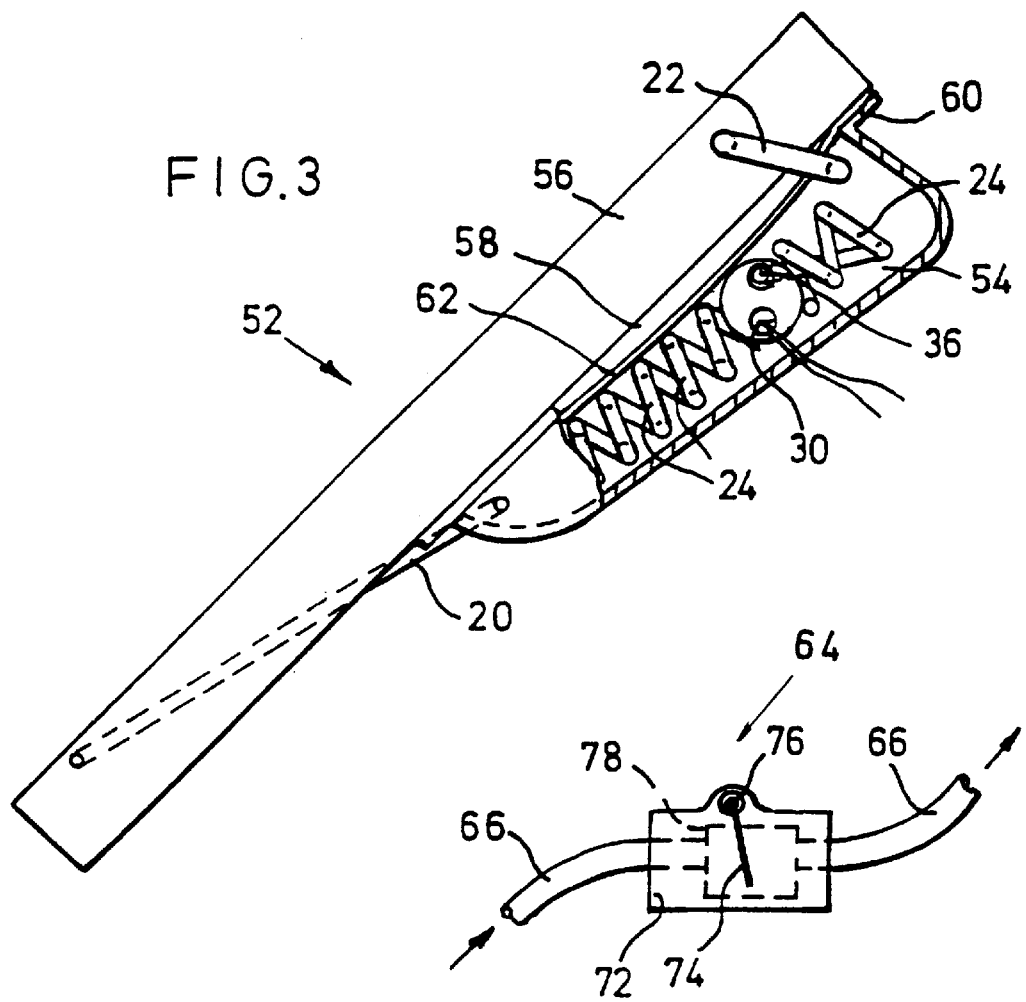
FIG. 3
FIG. 4
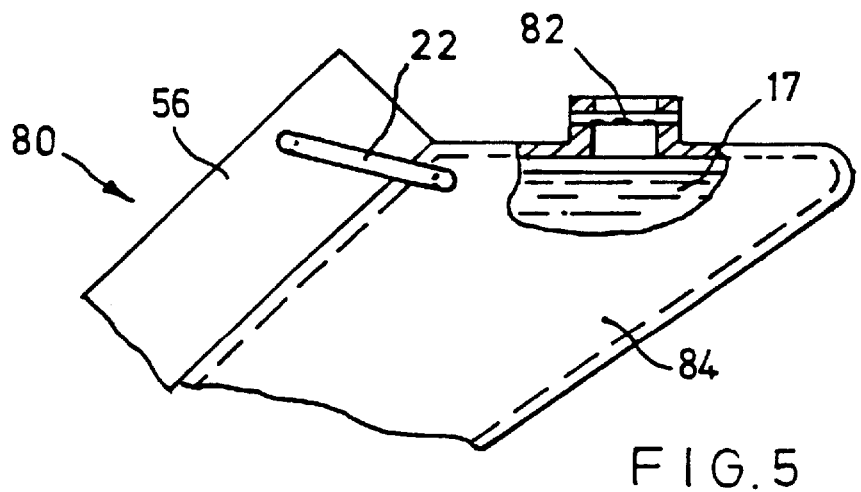
FIG. 5

WATER HEATER AND STORAGE TANK

BACKGROUND OF THE INVENTION

The present invention relates to a solar energy powered water heater and storage device. More particularly, the invention provides a low-profile, flat-plate solar energy collector holding a fluid which is heated and circulated to an integrated, insulated hot fluid storage tank, the hot fluid in turn heats line pressure water passing through an extended length, heat-exchange piping circuit incorporated within said tank, in conjunction with a supplementary, electric water-heating means.

A commonly-used device for electrically heating a continuous, moderate flow of water for domestic purposes, typically limited to 1.5 liter/minute, is fitted with a 3–5 kw heating element. Sucn devices are marketed in Israel under the name "ATMOR". A heating element of such capacity places a heavy strain on the electrical wiring of a typical residence, since a typical shower requires a flow of about 5 liter/minute, such devices are not satisfactory for supplying hot water for such needs.

Solar water heaters are also fitted with electric heater elements but, in contrast to the "ATMOR" type device, the water rarely requires electrically powered heating from ambient temperature, as even in the winter months some degree of water heating is obtained from solar radiation. Consequently, solar water heaters are fitted with a 2–2.5 kw heater element which, if operated for a sufficient length of time before hot water is required, is enough for all but extreme conditions. The electric heater is however situated far below the outlet providing hot water for consumption. Switching on the heater element when water is demanded, or a short time beforehand, will not provide hot water when needed and so will waste electricity.

The most widely used solar collectors and storage tanks operate by thermosyphon circulation and have a cylindrical storage tank positioned higher than the collector. The system operates wholly at line pressure and the stored liquid is water provided for consumption. An electric heater element positioned at the bottom of the tank boosts water temperature if so required.

The disadvantages of this system are known. Such devices are obtrusive architecturally, take up considerable roof space, need thick thermal insulation to reduce heat losses, and the storage tank and absorber are constructed of thick steel to resist line pressure which may be as high as 10 atmospheres in some localities. Several hours of electrical heating are required to provide hot water when insufficient solar radiation is available. The heater element continues to operate until the lower part of the storage tank holding a thermostat reaches the set-point temperature. The upper part of the tank is thus heated to well above to the temperature required by the user, and much electricity is wasted.

The architectural disadvantages and thermal insulation problems are overcome by solar water heaters having an integrated water storage tank. Integrated devices are described in U.S. Pat. No. 4,003,367 to Wikholm, U.S. Pat. No. 4,421,100 to Yu, U.S. Pat. No. 4,637,375 to Larkin, U.S. Pat. No. 5,462,047 to Kleinwachter, and in Israel Patents nos. 48 555 to Koor Metals and 53 396 to Shell Oil.

The Larkin device and the Shell Oil device allow line pressure to enter the storage tank, which must therefore be built sufficiently strong and of a shape able to resist such pressure. The Yu device is complicated by having 3 separate fluid circuits. The Koor Metals device has a complex collector and relies on radiation sensors to govern liquid circulation routes. The Wikholm device requires that substantially the whole storage volume be heated before hot water is obtained in the line pressure tubing. The Kleinwachter device provides only very low pressure supply to the consumer.

Systems having an integrated water tank and separate fluid circuits, the first such circuit including the absorber panel and the second circuit providing hot water for consumption, obtain certain advantages. One of these is the ability to use a fluid other than municipal water in the absorber panel circuit. Among the useful options for such fluid are:

a. the addition to the water of an anti-freeze substance;

b. the addition of a corrosion inhibitor;

c. the use of demineralized water to reduce the formation of deposits; and d. the use of a fluid other than water having more desirable heat-transfer properties.

Obviously, none of the above are feasible when the fluid in the absorber circuit is also being supplied for consumption. The concept of using two separate fluid circuits has long been known and is the central feature of a water heater disclosed by Bailey in U.S. Pat. No. 1,242,511, whose device is of the type having a spaced-apart absorber and storage tank.

A further consideration in the design of water heaters, using an electric heating element to provide some or all of the water heating capacity, is the importance of protecting the heating element against burn out. This can occur as a result of a water supply interruption of which the consumer is unaware, the continuing consumption causing the heating element to run dry and bum out. It is to be noted that while the cost of the replacement element may not be of much concern, the cost of its installation by an electrician will be several times the cost of the element itself.

AU-B-488085 discloses a solar heating apparatus comprising a closed box plate collector mounted so that one end thereof is higher than the other end; a tank mounted adjacent said plate collector so that a substantial part of said tank is higher than said collector and said tank being filled with a fluid heat-transfer medium; a pair of conduits for cold fluid heat-transfer medium flow arranged one adjacent each side of said collector communicating the lower part of said tank with the lower part of said collector; a substantially centrally-located conduit for heated fluid heat-transfer medium communicating the higher part of said collector with said tank; and a grid or coil of heat-conducting tubing located within said tank and having, disposed externally of said tank, an inlet thereto and an outlet therefrom.

However, this arrangement still leaves scope for improvement to provide a solar water heater capable of more rapid electrical temperature boosting.

SUMMARY OF THE INVENTION

It is therefore one of the objects of the present invention to obviate the disadvantages of the prior-art solar water heaters and storage units by providing a solar water heater which allows for electrical temperature boosting within a short time of its demand.

It is a further object of the present invention to utilize a low-pressure absorber and storage circuit, i.e. one which is not subject to line pressure, by using lighter materials of construction.

The present invention provides a a low-profile, solar energy powered, thermosyphon-circulated water heater and storage device, comprising: (a) a flat, tilted solar radiation absorber panel; (b) an insulated hot fluid storage tank; (c) a conduit providing fluid communication between a lower area of said absorber panel and said storage tank, and a further conduit providing fluid communication between an upper area of said absorber panel and an upper area of said storage tank to complete a thermosyphonic path between said panel and said tank, and to facilitate the circulation of fluid heated in said absorber panel into said fluid storage tank; (d) an extended-length heat-exchange piping circuit having an entry port for cold, line-pressure water, an outlet port for hot water and arranged within said tank to facilitate the transfer of heat between fluid held in said storage tank and line-pressure water passing through said piping; and (e) an electric water immersion heater positioned in a housing located in an upper area of said storage tank adjacent said extended length piping circuit and arranged to provide supplementary heat to water passing through said piping to provide hot water to the consumer, as well as providing supplementary heat to fluid contained in the upper area of said storage tank, whereby said heater is arranged to provide supplementary heat to water passing through said piping, as well as to fluid contained in the upper area of said storage tank, wherein said electric water heater is contained in a housing having an inlet port connected to receive water from said extended length piping circuit, and an outlet supply port connected to provide hot water to the consumer, whereby water passing from said piping into said housing is directly heated within said housing by said immersion heater.

In preferred embodiments of the present invention said housing is sleeve-like, and oriented substantially horizontally within said tank.

In order to facilitate the provision of the desired temperature water to the consumer with minimal wastage of electricity in especially preferred embodiments of the present invention said water heater and storage tank are provided with a thermostat positioned adjacent said electric water immersion heater.

In especially preferred embodiments of the present invention, said further conduit providing fluid communication between an upper area of said absorber panel and an upper area of said storage tank is preferably provided with a device arranged to prevent reverse-direction flow.

In a most preferred embodiment of the present invention there is provided a low-profile, solar energy powered, thermosyphon-circulated water heater and storage device, wherein the volume of the immersion heater housing is 15% or less of the volume of said storage tank.

In Israel Patent no. 54,416 Hadar describes and claims an electric water heater, particularly for domestic use, having a cold water inlet and a heated water outlet, comprising first and second water heating compartments in communication with each other, at least a first and second electric heating element provided within the first compartment, each individually controlled by a thermostatic device, first and second heat exchanging conduits in communication with each other, provided at a lower and an upper portion of the second compartment respectively, said cold water inlet being connected to said first circulation conduits, an intermediate water outlet provided within said first compartment for water flowing through said second circulation conduits, and an intermediate water inlet provided at said second compartment and connected to said heated water outlet. The heater described by Hadar, as distinct from the present invention, exposes the tank to line pressure cold water, and must be built to resist such pressure. The water being heated is also the water supplied for consumption so, in contradistinction to the present invention, there is no option in the Hadar heater of using other fluids for heating, such as, for example, demineralized water or a rust-inhibiting fluid. The Hadar heater requiring two heater elements and two thermostats is also quite complex and costly for a device specifically intended for domestic use.

Most significantly, the heating elements in said patent are oriented to heat water throughout said first and second compartments and the thermostats are positioned at the bottom of the tank to assure the heating of the water in both of said compartments.

In the present invention the electric heater, and preferably also the control thermostat, are positioned near the upper part of the storage tank, where the stored fluid is hottest, to gain several advantages. Fluid partially heated by the absorber panel pre-heats the water passing through the extended coil and then contacting the electric heater which supplies supplementary heat to ready the water for immediate use. Thus, the user need not wait until a large volume of water is electrically heated.

Furthermore, in preferred embodiments of the present invention, the thermostat can be set to switch off the electric heater as soon as the upper part of the stored fluid, or the water in the immersion heater housing is sufficiently hot, thus preventing wastage of electricity.

A distinguishing feature of the present invention lies in the novel manner of transferring heat from the electric heater element to the water. In conventional boilers, this is achieved by thermosyphonic circulation, while in the present invention water in the heater housing is heated by conduction, the hot water then heating the metal wall of said housing, which then heats water held in the tank.

A further distinguishing feature of the present invention lies in the close proximity of the electric heater to the point of supply. While in conventional water heaters flow around the electric element is slow, in the present invention water flow impacts the heater element and so achieves a high heat transfer coefficient.

It will be realized that the novel device of the present invention serves to:
a) make effective use of the electric booster heater to provide hot water when required;
b) prevent reverse flow in the storage circuit should the absorber be cooler than the contents of the storage tank;
c) allow the use of a fluid other than water in said storage circuit; and
d) allow the use of lightduty construction materials for the absorber and storage tank.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

BRIEF DESCRIPTION OF THE DRAWINGS

FIG. 3 is a fragmented, side elevational view of an embodiment using an elastomeric sheet in the storage tank;

FIG. 4 is a detail view of a device preventing reverse-direction flow in the thermosyphon circuit and FIG. 5 is a fragmented side elevational view of an embodiment provided with a diaphragm.

DESCRIPTION OF PREFERRED EMBODIMENTS

Figure 1:
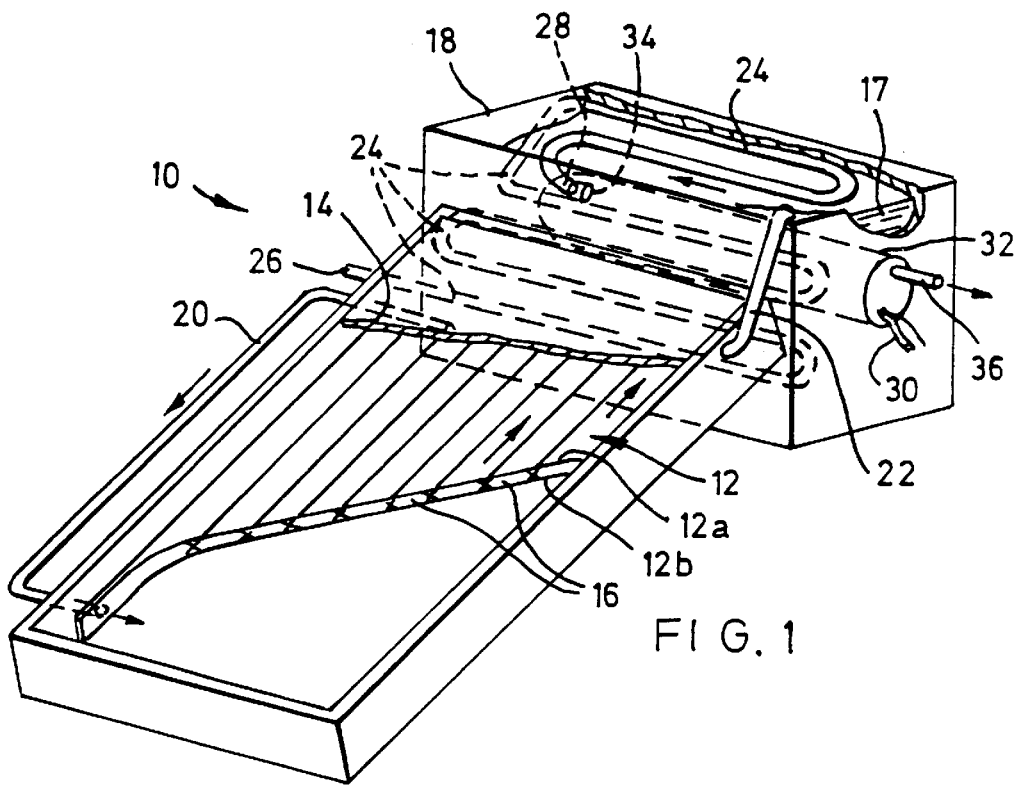
FIG. 1 is a partially broken away perspective view of a preferred embodiment of the water heater and storage tank shown as part of a solar water heating system.

There is seen in FIG. 1 a low-profile, solar energy powered, thermosyphon-circulated water heater and storage device 10. A flat, tilted solar radiation absorber panel 12 is covered with a spaced-apart glass cover sheet 14 in the conventional manner to reduce upward heat losses. The absorber panel 12 is preferably constructed of a pair of aluminium sheets 12a, 12b, and flow conduits 16 are provided between the sheets 12a, 12b for the low-pressure circulation of a fluid 17. Typically such pressure is 0.3 atm gauge pressure, or less.

Solar radiation is absorbed and converted to heat on the upper surface of panel 12a. Preferably, the panel 12a is provided with a wavelength-elective coating with high solar radiation absorption and low long-wave emittance. Coatings of this type are known to provide a cost-effective boost in efficiency, particularly under partially-cloudy conditions.

An insulated hot fluid storage tank 18 is positioned to the rear of the absorber panel 12. The tank 18 shown in the present embodiment is substantially oblong. Due to the low pressure to which tank 18 is subjected, there is no need to employ the conventional cylindrical tank used on most prior-art collector systems. The tank 18 can suitably be made of galvanized sheet steel, glass-reinforced polyester or an unreinforced thermoplastic protected by the addition of a UV absorbing stabilizer.

A conduit 20 provides fluid communication between a lower area of absorber panel 12 and storage tank 18. A further conduit 22 provides fluid communication between an upper area of absorber panel 12 an upper area of storage tank 18 to complete a thermosyphonic path between panel 12 and tank 18, and to facilitate the circulation of fluid heated in absorber panel 12 into fluid storage tank 18.

Where the device 10 is to be used in a location subject to freezing, the fluid 17 will comprise water with an anti-freeze material added. The use of demineralized water is advantageous to obviate the formation of deposits detrimental to good heat transfer.

An extended-length, heat-exchange, piping 24 circuit has an entry port 26 for cold, line-pressure water, and an outlet port 28 for hot water. The extended length is obtained in this embodiment by a pipe bent into a serpentine form having multiple coils. The piping 24 winds through the upper part of the storage tank 18, and from there onto an electric heater 30. The piping 24 is arranged to facilitate the transfer of heat between fluid 17 held in said storage tank and line-pressure water passing through piping 24. Such heat transfer usually takes place from the storage tank to the heat-exchange piping. Under most circumstances the water received by the user is not overheated, as is often the case in systems supplying water for consumption directly from the absorber system. Conversely, the water supplied after excessive use becomes cooler gradually using the heat-exchange system, whereas in other systems when water for consumption is supplied directly from the absorber circuit, water temperature quickly becomes uncomfortably cold as a result of excessive use.

It is also to be noted that the piping 24 provides hot water to the consumer at near line pressure, which, in comparison with low pressure supply systems, saves the time of the user and is of benefit during showering. Excessive line pressure is moderated by the bends in the piping 24.

An electric water immersion heater 30 is positioned in a housing 32. located in an upper area of storage tank 17, adjacent extended length piping 24. The heater 30, when needed, provides supplementary heat to water passing through piping 24 so as to provide hot water to the consumer, as well as providing supplementary heat to fluid 17 contained in the upper area of storage tank 18.

Figure 2:
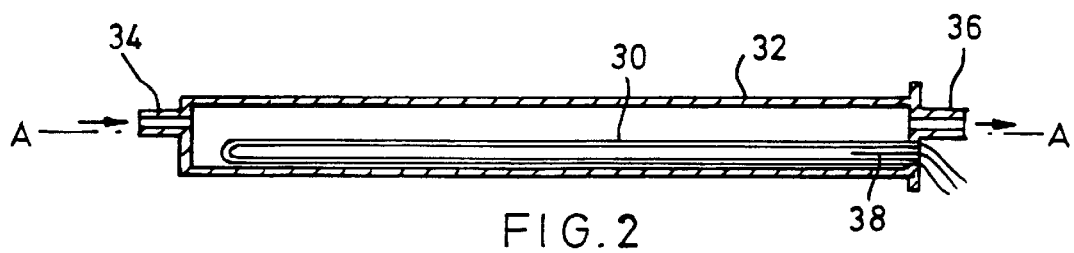
FIG. 2 is a detail sectional view of the electric heater used in the same embodiment.

Referring now to FIG. 2 the electric water heater 30 is contained in a housing 32, having an inlet port 34 connected to receive water from the extended length piping circuit outlet port 28, and an outlet supply port 36 connectable to provide hot water to the consumer.

Advantageously, the immersion heater housing 32 has a major axis AA oriented horizontally. The volume of the immersion heater housing 32 is 15% or less of the volume of storage tank 18. This is advantageous in making possible fast heating to the water being supplied to the consumer at the time of demand.

A thermostat 38, controls the heater element 30, and is preferably located in the housing 32. The thermostat 38 causes current cut-off as soon as the small volume of water inside the housing 32 reaches set-point temperature. A suitable set-point for general domestic use of the present device is 45 degrees C. This arrangement allows the user to leave the heater element 30 switched on for extended time periods without causing extensive waste of electricity. The housing 32 is arranged to retain water, even during a temporary failure in the incoming supply. The heater element 30 is thus protected against dry operation and subsequent burn-out.

FIG. 3 illustrates a detail of a further embodiment of low-profile, solar energy powered, thermosyphon-circulated water heater and storage device 52. The fluid storage tank, which is integrated with the absorber panel housing 56, is a tub-shaped container 54, having an open upper face 58, the rim 60 of which is sealed by an elastomeric sheet 62 clamped to the tub rim 60. The container 54 is readily cleanable by removing or exchanging the elastomeric sheet 62. Changes in fluid volume and pressure are easily accommodated by the elastomeric sheet 62. A suitable material therefore is butyl rubber.

The device 52 offers the advantages of an integrated design—it uses less roof space, is more architecturally acceptable, part of the heat losses from the collector panel rear face enter the storage tank instead of being lost to the atmosphere, and the preconnected piping saves installation time.

Seen in FIG. 4 is a detail of a low-profile, solar energy powered, thermosyphon-circulated water heater and storage device 64. The further conduit 66 provides fluid communication between (with reference to FIG. 1a) an upper area of the absorber panel 12 and an upper area of the storage tank 18. The device 72 is arranged to substantially prevent reverse-direction flow, and the consequent heat losses in the storage circuit, should the absorber panel 12 become cooler than the contents of the storage tank 18. Such a situation is to be expected at nighttime.

The standard type of check-valve, typically based on a spring-loaded ball, is not ideal for this use, as deposits building up on the ball or its seating are likely to cause serious leakage. In the preferred embodiment shown, the device 72 comprises a flap-type one-way valve. The flap 74 is suspended by a loose-fitting pivot 76 allowing the flap 74 to seal against the shoulder 78 should reverse flow occur. Under normal flow conditions, the flap 74 is angled away from the shoulder 78. Such a valve has the advantage of being able to function acceptably well at a low pressure differential even after suffering the effects of mineral deposits which are to be expected in water heaters.

Referring now to FIG. 5, there is depicted a detail of a low-profile, solar energy powered, thermosyphon-circulated water heater and storage device 80, here further provided with a diaphragm 82 connecting the storage tank 84 to the atmosphere. The diaphragm 82 allows for minor volume and pressure changes, and so makes possible the construction of the storage tank 84 out of light-duty materials, including recyclable plastics.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A low-profile, solar energy powered, thermosyphon-circulated water heater and storage device comprising:
   (a) a flat solar radiation absorber panel at an orientation tilted from horizontal and from vertical, the panel thereby having a lower area and an upper area;
   (b) an insulated hot fluid storage tank also having an upper area;
   (c) a conduit providing fluid communication between said lower area of said absorber panel and said storage tank, and a further conduit providing fluid communication between said upper area of said absorber panel and said upper area of said storage tank to complete a thermosyphonic path between said panel and said tank, and to facilitate the circulation of fluid heated in said absorber panel into said fluid storage tank;
   (d) an extended-length heat-exchange piping circuit having an entry port for cold, line-pressure water, an outlet port for hot waters and said piping circuit being arranged within said tank to facilitate the transfer of heat between fluid held in said storage tank and line-pressure water passing through said piping; and
   (e) a housing located in said upper area of said storage tank, an electric water immersion heater positioned in said housing and adjacent said extended length piping circuit, and said heater being arranged to provide supplementary heat to water passing through said piping and to provide supplementary heat by conduction to fluid contained in said upper area of said storage tank, said housing having an inlet port connected to receive water from said extended length piping circuit, and an outlet supply port connected to provide hot water, whereby water passing from said piping into said housing is directly heated within said housing by said immersion heater.

2. A low-profile, solar energy powered, thermosyphon-circulated water heater and storage device according to claim 1, wherein said fluid storage tank is a tub-shaped container having an upper face having an elastomeric sheet clamped to said rim and sealing said rim.

3. A low-profile, solar energy powered, thermosyphon-circulated water heater and storage device according to claim 1, wherein said further conduit providing fluid communication between said upper area of said absorber panel and said upper area of said storage tank includes a device arranged to prevent reverse-direction flow.

4. A low-profile, solar energy powered, thermosyphon-circulated water heater and storage device according to claim 3 wherein said device comprises a flap-type one-way valve.

5. A low-profile, solar energy powered, thermosyphon-circulated water heater and storage device according to claim 1, further comprising with a diaphragm connecting said storage tank to the atmosphere.

6. A low-profile, solar energy powered, thermosyphon-circulated water heater and storage device according to claim 1, wherein the volume of said immersion heater housing is at most 15% or less of the volume of said storage tank.

7. A low-profile, solar energy powered, thermosyphon-circulated water heater and storage device according to claim 1, wherein said immersion heater housing has a major axis which is oriented horizontally.

8. A low-profile, solar energy powered, thermosyphon-circulated water heater and storage device according to claim 1, further comprising with a thermostat positioned in said housing located in said upper area of said storage tank.

9. A low-profile, solar energy powered, thermosyphon-circulated water heater and storage device according to claim 1, wherein said immersion heater housing has a major axis oriented horizontally.

10. A low-profile, solar energy powered, thermosyphon-circulated water heater and storage device according to claim 1, further provided with a thermostat positioned in said housing located in an upper area of said storage tank.

* * * * *